US012632042B2

(12) United States Patent
Strinden et al.

(10) Patent No.: US 12,632,042 B2
(45) Date of Patent: May 19, 2026

(54) MODULE INTERFACE

(71) Applicant: FISHER-ROSEMOUNT SYSTEMS, INC., Round Rock, TX (US)

(72) Inventors: Daniel R. Strinden, Austin, TX (US); Cristopher Ian Sarmiento Uy, Metro Manila (PH); Prashant Joshi, Leicester (GB); Julian K. Naidoo, Cedar Park, TX (US); Ram Ramachandran, Austin, TX (US); Andrew E. Cutchin, Killeen, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 845 days.

(21) Appl. No.: 17/872,954

(22) Filed: Jul. 25, 2022

(65) Prior Publication Data

US 2024/0028003 A1     Jan. 25, 2024

(51) Int. Cl.
*G05B 19/418*     (2006.01)

(52) U.S. Cl.
CPC ................. *G05B 19/41835* (2013.01); *G05B 2219/31121* (2013.01)

(58) Field of Classification Search
CPC .............. G05B 19/042; G05B 19/0423; G05B 19/0426; G05B 19/418; G05B 19/41835; G05B 2219/25257; G05B 2219/25428; G05B 2219/31121
See application file for complete search history.

(56) References Cited

U.S. PATENT DOCUMENTS

| | | | | |
|---|---|---|---|---|
| 5,960,441 A * | 9/1999 | Bland | ................. | G05B 19/418 |
| 10,671,038 B2 * | 6/2020 | Jundt | ................. | H04L 12/4625 |
| 10,915,081 B1 * | 2/2021 | Nixon | ................. | H04W 84/18 |
| 11,609,542 B2 * | 3/2023 | Jundt | ................. | H04L 12/00 |
| 2005/0216600 A1 * | 9/2005 | Maron | ................. | H04L 67/133 |
| | | | | 709/224 |
| 2007/0106761 A1 * | 5/2007 | Beoughter | ............. | H04L 67/51 |
| | | | | 709/219 |

(Continued)

FOREIGN PATENT DOCUMENTS

| | | |
|---|---|---|
| GB | 2472682 A | 2/2011 |
| GB | 2495434 A | 4/2013 |
| GB | 2612393 A | 5/2023 |

OTHER PUBLICATIONS

Search Report for Application No. GB2311343.4, dated Jan. 25, 2024.

*Primary Examiner* — Thomas C Lee
(74) *Attorney, Agent, or Firm* — MARSHALL, GERSTEIN & BORUN LLP

(57)     ABSTRACT

A process control system includes one or more field devices positioned in a process control plant and a control module configured to generate control signals for controlling the one or more field devices. The control module may be configured to operate on one or more internal parameters to execute a control strategy. A control module software interface may be configured to define a set of interface parameters based on a strategy type associated with the control strategy of the control module. Each interface parameter of the set of interface parameters may be linked to one of the one or more internal parameters of the control module. Additionally, each interface parameter may be accessible by other control modules and/or other external applications.

18 Claims, 12 Drawing Sheets

(56) References Cited

U.S. PATENT DOCUMENTS

| | | | |
|---|---|---|---|
| 2007/0233282 A1* | 10/2007 | Fox | G05B 19/4185 |
| | | | 700/11 |
| 2008/0228290 A1* | 9/2008 | Kalhoff | G05B 19/41885 |
| | | | 700/17 |
| 2019/0103763 A1* | 4/2019 | Colclazier | H02J 3/04 |
| 2019/0121320 A1* | 4/2019 | May | G05B 19/4083 |
| 2021/0357084 A1* | 11/2021 | Jundt | G06F 3/0486 |
| 2023/0393543 A1* | 12/2023 | Nixon | G06F 16/252 |

* cited by examiner

MODULE INTERFACE

FIELD OF THE DISCLOSURE

This patent application relates generally to process plants and process control systems and, more particularly, to systems and methods for configuring control modules in process control systems.

BACKGROUND

Distributed industrial process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment of the industrial process plant (which is interchangeably referred to herein as a "field environment" or a "plant environment" of the industrial process plant), and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a control routine or application that runs, for example, different control modules which utilize different control algorithms make process control decisions, generate process control signals based on the received information and coordinate with the control modules or blocks being performed in the field devices, such as HART®, WirelessHART®, and FOUNDATION® Fieldbus field devices. To perform this communication, the control modules in the process controller send the control signals to various different input/output (I/O) devices, which then send these control signals over specialized communication lines or links (communication physical layers) to the actual field devices to thereby control the operation of at least a portion of the process plant or system, e.g., to control at least a portion of one or more industrial processes running or executing within the plant or system. The I/O devices, which are also typically located within the plant environment, are generally disposed between a process controller and one or more field devices, and enable communications there-between, e.g., by converting electrical signals into digital values and vice versa. Different I/O devices are provided to support field devices that use different specialized communication protocols. More particularly, a different I/O device is provided between a process controller and each of the field devices that uses a particular communication protocol, such that a first I/O device is used to support HART field devices, a second I/O device is used to support Fieldbus field devices, a third I/O device is used to support Profibus field devices, etc. As utilized herein, field devices, controllers, and I/O devices are generally referred to as "process control devices," and are generally located, disposed, or installed in a field environment of a process control system or plant.

Still further, information from the field devices and the process controller is usually made available through the process controllers over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths, and typically uses a packet based communication protocol and non-time sensitive communication protocol, such as an Ethernet or IP protocol.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which may be objects in an object-oriented programming protocol that perform functions within the control scheme based on inputs thereto and that provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, the configuration application allows configuration designers to flexibly configure both logic and inter-module communication for control modules as needed. However, over time, as logical and inter-module communication links are added and removed, a logic diagram for a control module can become cluttered with extraneous parameters that are not essential for logic execution. In many cases, these extraneous parameters are interface parameters that exist for the purpose of forming an interface to communicate with other control modules and operator displays. Generally speaking, interface parameters are included at the discretion of the configuration designer who configures a particular control module, and are not required as a standard part of the configuration of a control module.

However, without the enforcement of a well-defined interface to a control module, "spaghetti code" arises because other control modules and other operator displays can read or write anything to the internal parameters of any control module. Consequently, as internal parameters of the control module are modified over time, it can become difficult to troubleshoot or otherwise modify the internal parameters of the control module at a later time without breaking communication links the internal parameters of the control module may have to other control modules or external applications.

SUMMARY

A control module software interface enables a configuration engineer to configure control modules in a process control system by defining interface parameters and a strategy type for each control module of the process control system, and linking each interface parameter to an internal parameter of the control module. The interface parameters provide a well-defined communication interface supported by the control module. For a given control module, the strategy type (e.g., analog control) defines the starting set of interface parameters that are appropriate for the control strategy of the module, and the interface parameters link the communication interface for the control module to the internal parameters of the control module.

Consequently, when interface parameters are maintained, the internal parameters of the control module may be updated or corrected without accidentally breaking connections to other control modules or other applications, such as operator display applications. Advantageously, these interface parameters do not need to appear in the logic diagram of the control module, allowing for a less cluttered logic diagram. Furthermore, the interface parameters can be given more user-friendly external-facing names and descriptions (compared to naming conventions for internal parameters), making it easier for other configuration engineers and operators to understand the configuration. Beneficially, because the defined strategy types will generally more closely match a configuration engineer's real-world mental model of the configuration, this process control configuration application allows for more intuitive building of the configuration model.

Advantageously, by implementing interface parameters and strategy types in the configuration of the control module, best configuration practices of encapsulation may be enforced, and "spaghetti code" in control modules may be reduced. Furthermore, by implementing interface parameters and strategy types in the configuration of the control module, the systems and methods provided herein allow for improved maintenance, improvement, and troubleshooting of the control module.

In one embodiment, a process control system includes one or more field devices positioned in a process control plant and a control module configured to generate control signals for controlling the one or more field devices. The control module may be configured to operate on one or more internal parameters to execute a control strategy. A control module software interface may be configured to define a set of interface parameters based on a strategy type associated with the control strategy of the control module. Each interface parameter of the set of interface parameters may be linked to one of the one or more internal parameters of the control module. Additionally, each interface parameter may be accessible by other control modules and/or other external applications.

For instance, the one or more external applications may include a display application.

In some examples, the one or more internal parameters of the control module are not accessible by another control module or by any external applications.

Additionally, in some examples, one or more interface parameters of the set of interface parameters are linked to one of the one or more respective internal parameters of the control module by the control module software interface based on input from a user. Moreover, in some examples, one or more interface parameters of the set of interface parameters are automatically linked to one of the one or more respective internal parameters of the control module by the control module software interface.

In some examples, each interface parameter is associated with a name, and wherein the name is accessible by one or more of another control module or by one or more external applications. Furthermore, in some examples, the name with which each interface parameter is associated is specified based on input from a user.

In some examples, the interface parameter being accessible by one or more of another control module or by one or more external applications includes the interface parameter being accessible to be one or more of: (i) written to or (ii) read by one or more of another control module or by one or more external applications. Moreover, in some examples, whether the interface parameter is accessible to be (i) written to or (ii) read by one or more of another control module or by one or more external applications is specified based on input from a user.

Additionally, in some examples, scaling units for each interface parameter are specified based on input from a user.

Furthermore, in some examples, interface parameter types for reach respective interface parameter are specified based on input from a user.

Moreover, in some examples, one or more interface parameters of the set of interface parameters are associated with security permissions restricting changes that can be made to the one or more interface parameters during runtime of the process control plant.

In another embodiment, a method in a process control system includes defining, by a control module software interface, a set of interface parameters for a control module based on a strategy type associated with a control strategy of the control module. The method further includes linking, by the control module software interface, each interface parameter of the set of interface parameters to a respective internal parameter of the control module. The control module may be configured to operate on the one or more internal parameters to execute the control strategy in order to generate control signals for controlling one or more field devices positioned in a process control plant. The method includes allowing, by the control module software interface, one or more of another control module or one or more external applications to access the set of interface parameters for the control module.

For instance, the one or more external applications may include a display application.

In some examples, the method may further include denying, by the control module software interface, the one or more of another control module or by the one or more external applications access to the internal parameters for the control module.

Additionally, in some examples, the method may include specifying, by the control module software interface, which interface parameter is to be linked to which respective internal parameter of the control module based on input from a user. Furthermore, in some examples, one or more interface parameters of the set of interface parameters are automatically linked to respective internal parameters of the control module.

Moreover, in some examples, the method may include specifying, by the control module software interface, a name for each interface parameter based on input from a user.

Furthermore, in some examples, allowing one or more of another control module or one or more external applications to access the set of interface parameters for the control module includes allowing one or more of another control module or one or more external applications to access the names associated with each of the interface parameters for the control module.

Additionally, in some examples, the method may include specifying, by the control module software interface, which interface parameters of the set of interface parameters are to be accessible to be (i) written to or (ii) read by one or more of another control module or by one or more external applications based on input from a user.

Moreover, in some examples, the method may include specifying, by the control module software interface, scaling units for each interface parameter based on input from a user.

Furthermore, in some examples, the method may include specifying, by the control module software interface, interface parameter types for each interface parameter based on input from a user.

Additionally, in some examples, the method may include specifying, by the control module software interface, security permissions for each interface parameter based on input from a user, wherein the security permissions for a respective interface parameter restrict changes that can be made to the interface parameter during runtime of the process control plant.

DETAILED DESCRIPTION

Figure 1:
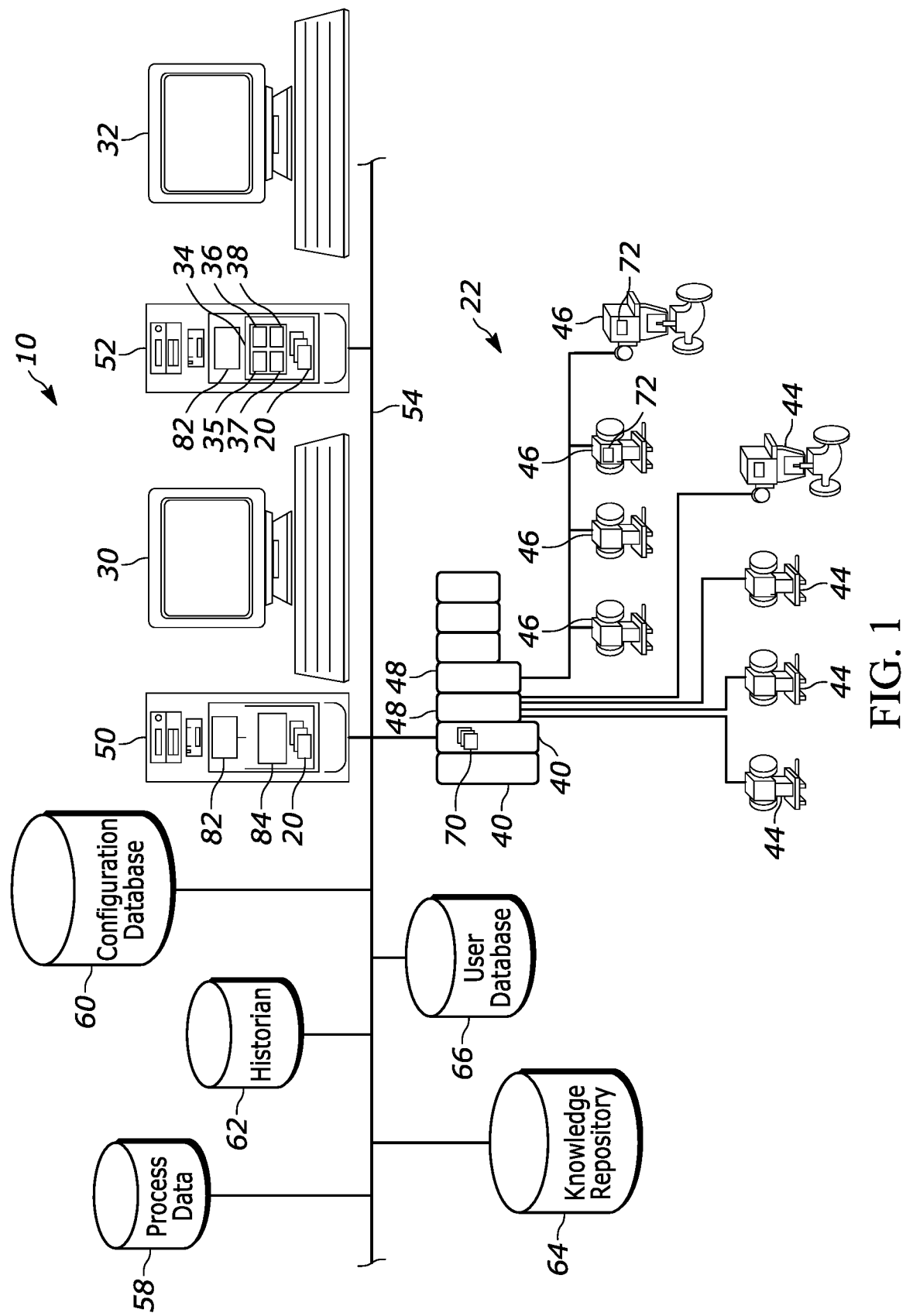
FIG. 1 is a schematic representation of process plant that includes a distributed process control network and several operator workstations that implement a configuration system that includes a control module software interface.

FIG. 1 illustrates an example process plant 10. The distributed process control system 22 of the process plant 10 illustrated in FIG. 1 has one or more controllers 40, each of which is connected to one or more field devices 44 and 46 (which may be smart devices) via input/output (I/O) devices or cards 48 which may be, for example, Fieldbus interfaces, Profibus interfaces, HART interfaces, standard 4-20 ma interfaces, etc. The controllers 40 are also coupled to one or more host or operator workstations 50-52 via a data highway 54 which may be, for example, an Ethernet link. A process data database 58 may be connected to the data highway 54 and operates to collect and store process variable, process parameter, status and other data associated with the controllers, field devices and any other devices within the plant 10. During operation of the process plant 10, the process data database 58 may receive process data from the controllers 40 and, indirectly, the field devices 44-46 via the data highway 54.

A configuration database 60 stores the current configuration of the process control system 22 within the plant 10 as downloaded to and stored within the controllers 40 and field devices 44 and 46. The configuration database 60 stores process control functions defining the one or several control strategies of the process control system 22, configuration parameters of the devices 44 and 46, the assignment of the devices 44 and 46 to the process control functions, and other configuration data related to the process plant 10. The configuration database 60 may additionally store graphical objects or user displays as well as configuration data associated with these objects or displays to provide various graphical representations of elements within the process plant 10.

Another data historian 62 stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a knowledge repository 64 stores references, operator logbook entries, help topics, or links to these and other documentation that operators and maintenance technicians may find useful when supervising the process plant 10. Still further, a user database 66 stores information about users such as the operator and the maintenance technician. For each user, the user database 66 may store, for example, his or her organizational role, an area within the process plant 10 with which the user is associated, work team association, security information, system privileges, etc.

Each of the databases 58-66 may be any desired type of data storage or collection unit having any desired type of memory and any desired or known software, hardware or firmware for storing data. Of course, the databases 58-66 need not reside in separate physical devices. Thus, in some embodiments, some of the databases 58-66 may be implemented on a shared data processor and memory. In general, it is also possible to utilize more or fewer databases to store the data collectively stored and managed by the databases 58-66 in the example system of FIG. 1.

While the controllers 40, 1/O cards 48 and field devices 44 and 46 are typically located down within and distributed throughout the sometimes harsh plant environment, the operator workstations 50 and 52 and the databases 58-64 are usually located in control rooms or other less harsh environments easily assessable by controller, maintenance, and various other plant personnel. However, in some cases, handheld devices may be used to implement these functions and these handheld devices are typically carried to various places in the plant. Such handheld devices, and in some cases, operator workstations and other display devices may be connected to the plant network 22 via wireless communication connections.

Each of the controllers 40, which may be, by way of example, the DeltaV™ controller sold by Emerson Process Management, stores and executes a controller application that implements a control strategy using any number of different, independently executed, control modules or blocks 70. Each of the control modules 70 may be made up of what are commonly referred to as function blocks wherein each function block is a part or a subroutine of an overall control routine and operates in conjunction with other function blocks (via communications called links) to implement process control loops within the process plant 10. Function blocks, which may be objects in an object oriented programming protocol, typically perform one of an input function, such as that associated with a transmitter, a sensor or other process parameter measurement device, a control function, such as that associated with a control routine that performs PID, fuzzy logic, etc., control, or an output function that controls the operation of some device, such as a valve, to perform some physical function within the process plant 10. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 40 may also support the AMS© suite of applications sold by Emerson Process Management and may use predictive intelligence to improve availability and performance of production assets including mechanical equipment, electrical systems, process equipment, instruments, non-smart and smart field devices 44, 46, etc.

In the plant network 10 illustrated in FIG. 1, the field devices 44 and 46 connected to the controllers 40 may be standard 4-20 ma devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 46 in FIG. 1), may store and execute modules, or sub-modules, such as function blocks, associated with the control strategy implemented in the controllers 40 or which perform other actions within the process plant, such as data collection, trending, alarming, calibration, etc. Function blocks 72, which are illustrated in FIG. 1 as being disposed in two different ones of the Fieldbus field devices 46, may be executed in conjunction with the execution of the control modules 70 within the controllers 40 to implement process control. Of course, the field devices 44 and 46 may be any types of devices, such as sensors, valves, transmitters, positioners, etc., and the I/O devices 48 may be any types of I/O devices conforming to any desired communication or controller protocol such as HART, Fieldbus, Profibus, etc.

With continued reference to FIG. 1, the workstations 50 and 52 may include various applications that are used for various different functions performed by the personnel within the plant 10. Each of the workstations 50 and 52 includes a memory 80 that stores various applications, programs, data structures, etc., and a processor 82 which may be used to execute any of the applications stored in the memory 80. In the example illustrated in FIG. 1, the workstation 50 also includes one or more process controller configuration applications 84 which may include, for example the display or graphical configuration system 34 having the graphics configuration application or engine 35, the configuration form editor 36, the configuration form application 37 and the storage application 38, which may be used to create various user displays and display elements (such as template GEMs and gadgets) and configuration forms therefor. The process controller configuration applications 84 may further include control module creation applications, operator interface applications and other data structures which can be accessed by any authorized configuration engineer to create and download control routines or modules, such as the control modules 70 and 72, to the various controllers 40 and devices 46 of the plant 10. In particular, the configuration applications 84 may include a control module software interface that enables a configuration engineer to configure control modules by defining interface parameters and a strategy type for each control module, and linking each interface parameter to an internal parameter of the control module.

Figure 2:
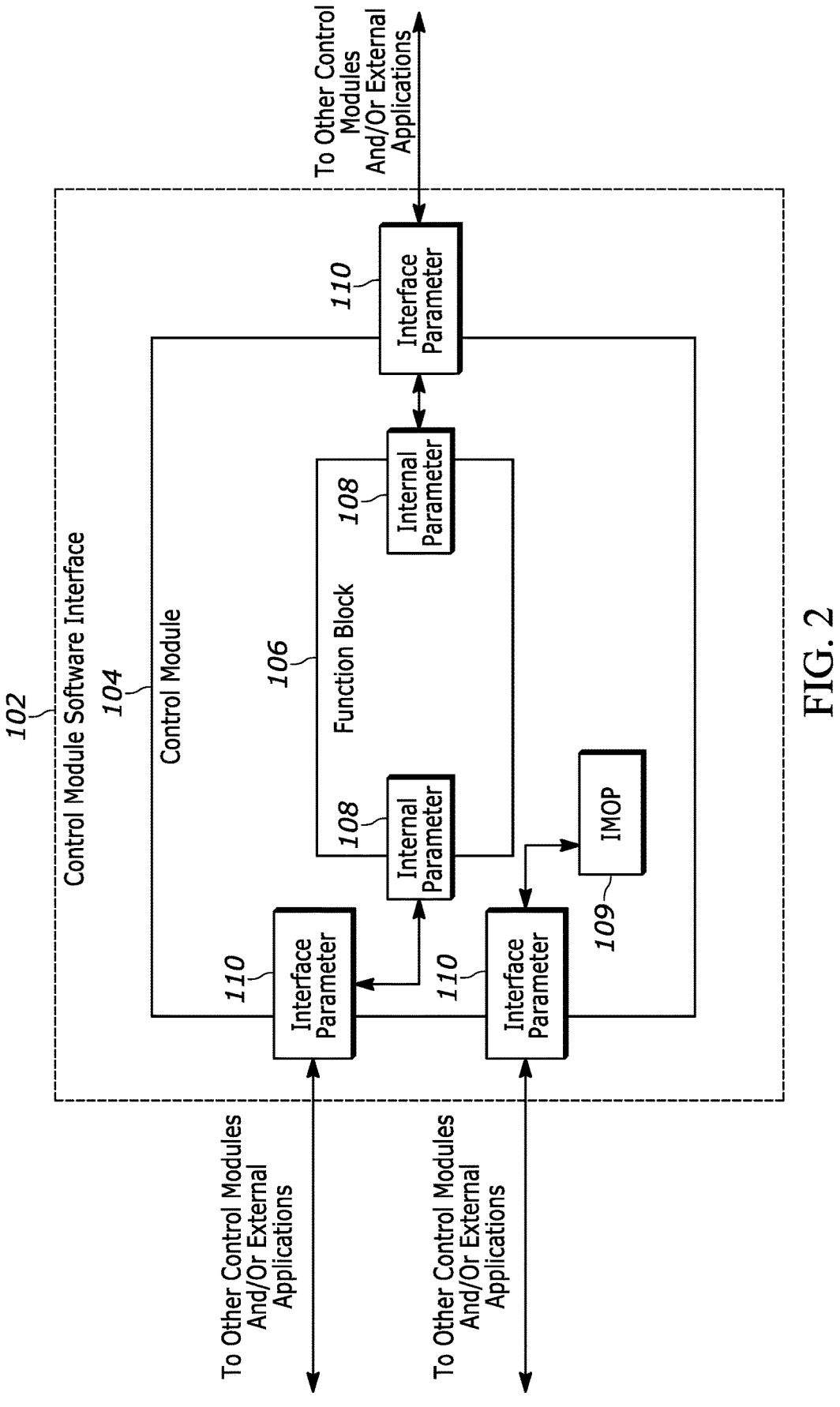
FIG. 2 illustrates a data flow diagram associated with the operation of a control module software interface that enables a user to configure control modules in a process control system by defining interface parameters and a strategy type for each control module of the process control system, and linking each interface parameter to an internal parameter of the control module.

For example, FIG. 2 is block diagram that illustrates a data flow diagram associated with the operation of a control module software interface 102. In an example, a control module 104 may include one or more function blocks 106. The function blocks 106 may operate on one or more internal parameters 108 to execute a control strategy in order to generate control signals for controlling one or more field devices 44 and 46 positioned in the process control plant 10. The internal parameters 108 may include various inputs for the function block 106 as well as various outputs of the function block 106. In other examples, the control module may implement the control strategy in other ways, i.e., using other control module types that do not include function blocks 106.

In any case, the control module software interface 102 creates interface parameters 110, each linked to an internal parameter 108 of the control module 104. The interface parameters 110 may be read, or, in some cases, written to, by other control modules or other external applications, such as other configuration applications or display applications, while the internal parameters 108 may be shielded from other control modules or other external applications by the control module software interface 102. That is, the internal parameters 108 may be read from or written to by their respective interface parameters 110, but may not be read from or written to directly by any external applications or other control modules.

Additionally, in some examples, the control module 104 may further include one or more implicit module operator parameters (IMOPs) 109, and the control module software interface 102 may create interface parameters 110 that link to IMOPs 109 as well as internal parameters 108. IMOPs 109 provide a means for non-control functions to access configured properties of control modules, such as the title of the module and/or the description of the module. Generally speaking, control modules include the following IMOPs: "Name," which is used to reference the current value of the name of the module; "Title," which is used to reference the current value of the title (or name) of the control module, "Description," which is used to reference the current value of the description of the control module; and "Display Title," which is used to conditionally show the current value of the title (or name) of the control module, supporting a 'display decluttering' feature. IMOPs require no configuration, and thus they are not visible in module engineering applications. Furthermore, users cannot add/remove IMOPs 109, and IMOPs 109 have no configurable properties. IMOPs 109 have fixed names, are always 'read-only', have no configurable title or description, and have no scale/engineering units/precision information. Furthermore, no history collection is supported for IMOPs 109.

In any case, whether linked to an internal parameter 108 or an IMOP 109, interface parameters 110 defined for a control module 104 are the only parameters that can be used by: other modules (i.e., other modules that are not part of the same multi-module control strategy), or continuous history data collection displays (both system created views and user-configured 'data links'), and therefore serve to decouple the inner workings of (and changes to) control logic from other parts of the system. Advantageously, this leads to fewer inadvertently broken references, and more robust system operation. In some examples, defining the interface parameters 110 for a control module 104 early can also promote parallel configuration of control logic and operator graphics.

In particular, internal parameters 108 and IMOPs 109 within a control module 104 need not be exposed as interface parameters 110 to be visible to (and used by) applications involved in module configuration, debugging, tuning, or diagnosis. Furthermore, using the control module software interface 102, inputs and outputs of the control module 104 can be classified as internal parameters 108 rather than being automatically classified as interface parameters 110 for the control module 104, and thus are not accessible from other modules, displays, etc.

Figure 3:
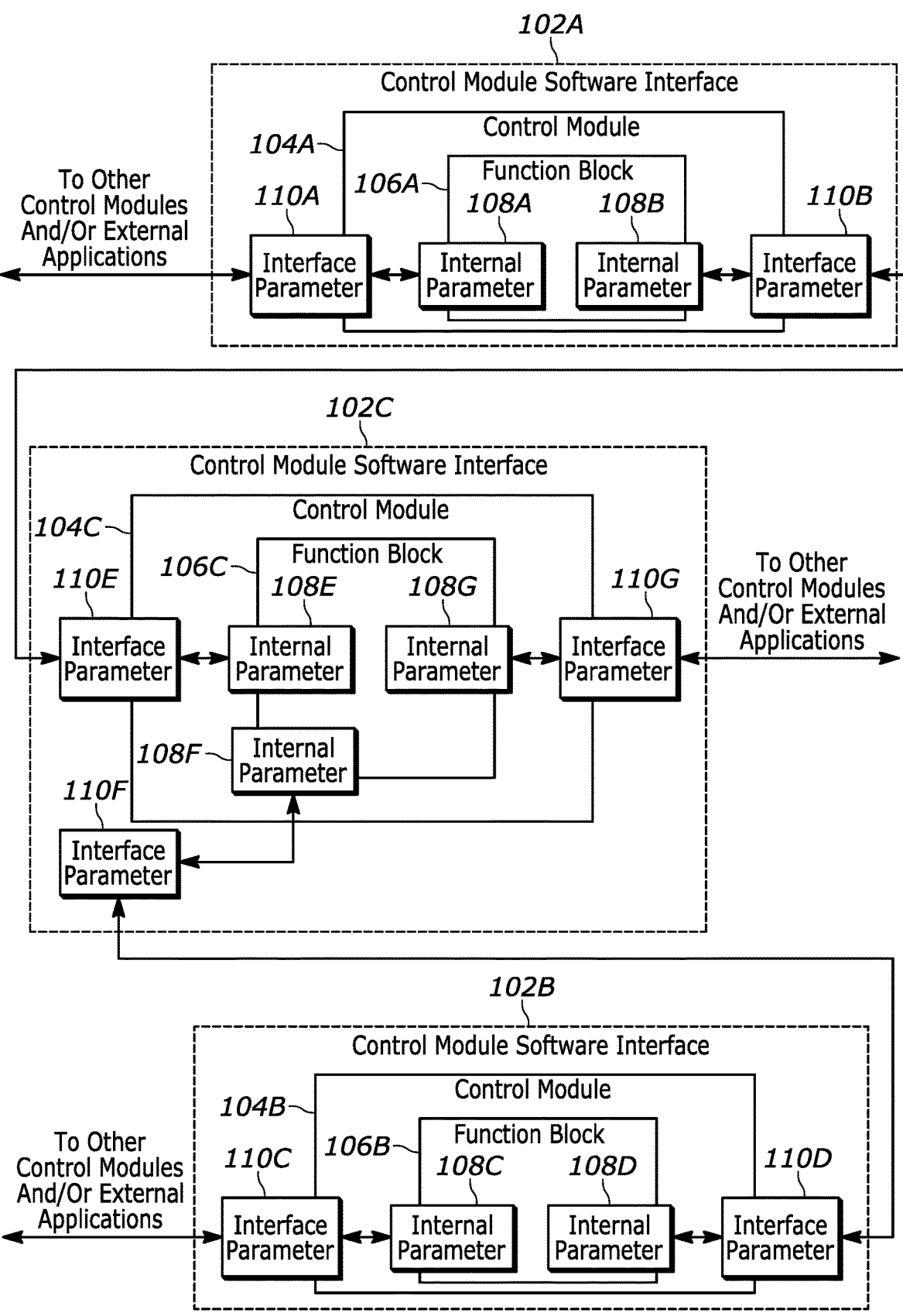
FIG. 3 illustrates a data flow diagram associated with the operation of a control module software interface that enables a user to configure control modules in a process control system by linking interface parameters of one control module to interface parameters of another control module, or to other external applications.

FIG. 3 is block diagram that illustrates a data flow diagram associated with the operation of a control module software interface that enables a user to configure control modules in a process control system by linking interface parameters of one control module to interface parameters of another control module, or to other external applications. For example, FIG. 3 illustrates three control module software interfaces 102A, 102B, and 102C. Each control module software interface may include a respective control module (104A, 104B, and 104C, respectively), and a respective function block (106A, 106B, and 106C, respectively). Each function block 106A, 106B, 106C may operate on respective internal parameters. For instance, function block 106A may operate on an input internal parameter 108A to produce an output internal parameter 108B. Similarly, function block 106B may operate on input internal parameter 108C to produce an output internal parameter 108D. Finally, function block 106C may operate on input internal parameters 108E and 108F to produce an output internal parameter 108G. Each of these various internal parameters 108A-108G may be linked to a respective interface parameter 110A-110G.

As discussed above with respect to FIG. 2, the interface parameters 110A-110G may be read by or written to by other control modules, while the internal parameters 108A-108G are not. For instance, control module 104C cannot directly access the internal parameters 108A or 108B of control module 104A, or the internal parameters 108C or 108D of control module 104B. However, control module 104C can access the interface parameters 110A and 110B linked to the respective internal parameters 108A and 108B. Similarly, control module 104C can access the interface parameters 110C and 110D linked to the respective internal parameters 108C and 110D. Accordingly, interface parameter 110E can, for example, read a value associated with the output internal parameter 108B of function block 106A via the interface parameter 110B. This output value can then be written to the internal parameter 108E by the interface parameter 110E, and used as an input for function block 106C. Similarly, interface parameter 110F can read a value associated with the output internal parameter 108D of the function block 106B via the interface parameter 110D. This output value can then be written to the internal parameter 108F by the interface parameter 110F, and the internal parameters 108E and 108F can be operated upon by the function block 106C to produce the output internal parameter 108G. Any other control modules or applications that require access to the value of the output internal parameter 108G can do so via the interface parameter 110G rather than reading to or writing to the internal parameter 108G directly.

Because only the interface parameters 110A-110G communicate with external control modules or applications, configuration engineers can modify function blocks 106A-106C as needed without "breaking" any external applications or control modules that rely on values produced by those function blocks. That is, for instance, if the operator changes the function block 106A in some way, e.g., changes the function block 106A of the control module 106A from a PID function block to an analog function block, the internal names of the internal parameters 108A and 108B on which the function block 106A operates may change. However, as long as the internal parameters 108A and 108B remain linked to their respective interface parameters 110A and 110B, and the names of interface parameters 110A and 110B remain the same, other control modules such as 104C that rely on outputs from the control module 104A can still easily access outputs of the function block 106A via the interface parameter 110B.

As another example, if the operator adds an additional function block to the control module 104B, e.g., such that internal parameter 108C is the input to a first function block which produces an output internal parameter, which is in turn provided as an input to a second function block which produces an output internal parameter that may be different from the output internal parameter 108D to which the interface parameter 110D is originally linked, the configuration engineer can change the internal parameter to which the interface parameter 110D is linked as needed to account for changes in the function blocks of the control module 104B. Meanwhile, other control modules, such as control modules 104C, that rely on interface parameter 110D, do not need to be updated based on changes have been made to the function blocks of the control module 104B in order to maintain a connection to the interface parameter 110D.

FIGS. 4A-4H illustrate screens depicting a user interface of a control module software interface that enables a user to configure control modules in a process control system by defining interface parameters and a strategy type for each control module of the process control system, and linking each interface parameter to an internal parameter of the control module.

Figure 4A:
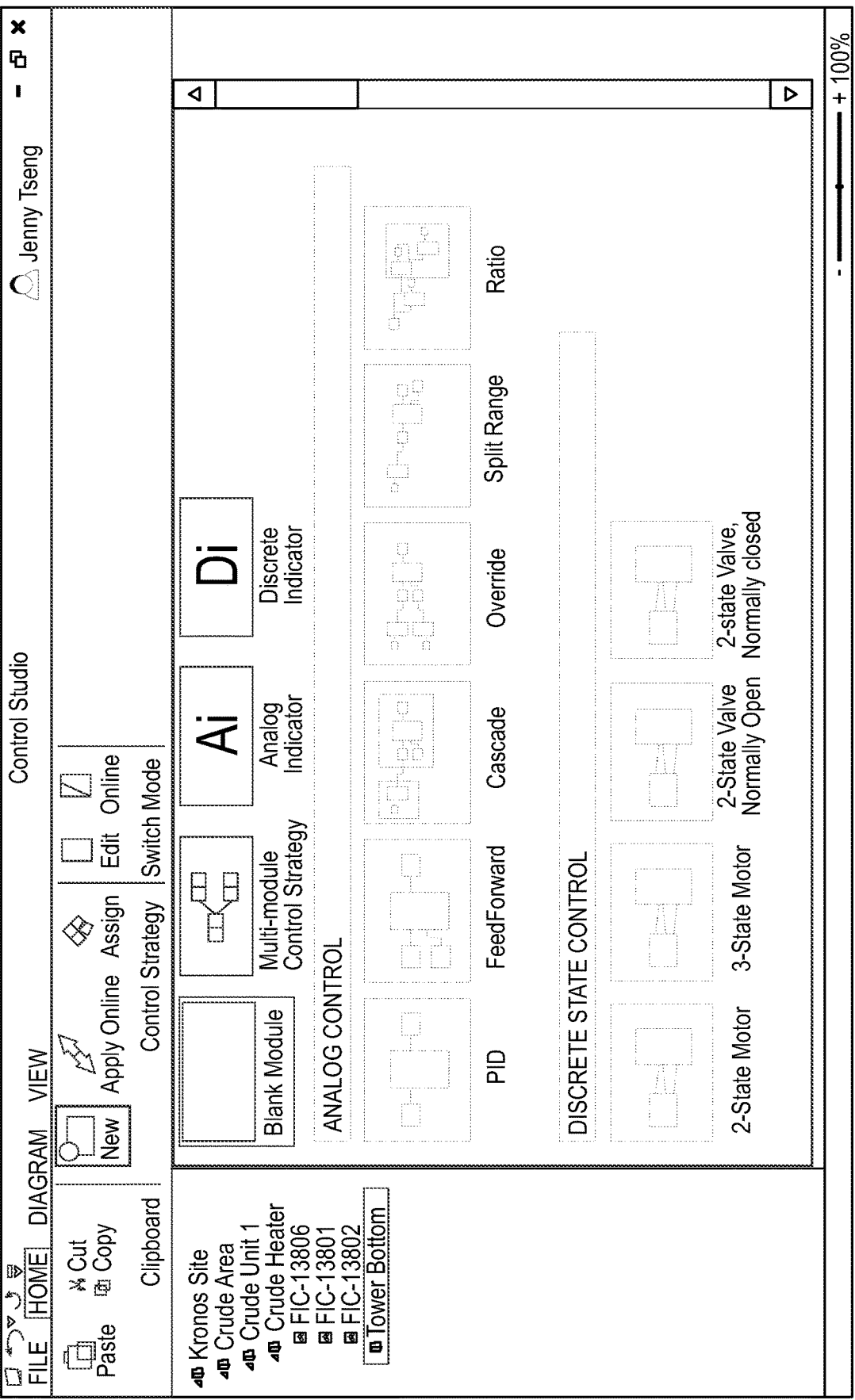
FIGS. 4A-4H illustrate example screens depicting a user interface of a control module software interface that enables a user to configure control modules in a process control system by defining interface parameters and a strategy type for each control module of the process control system, and linking each interface parameter to an internal parameter of the control module.

As shown at FIG. 4A, a user (e.g., a configuration engineer) of the control module software interface may generally select between various types of control strategies for a control module of a process control system. Generally speaking, a strategy type is a named collection of pre-configured control module interface parameters. A strategy type improves and accelerates the control module configuration experience by quickly establishing the interface parameter names needed to satisfy (built-in) primitive (or custom) display elements for control modules along with default values for other interface parameter properties. The "starter configuration" will include at least one strategy type for each primitive display element intended for use with function block algorithm control modules. Users may create/modify/delete strategy types to correspond with custom control logic. Users may specify zero or one strategy type to use for a control module. While a strategy type is specified, all interface parameter names in the strategy type will appear as an interface parameter (to be resolved) for the control module. Users may add (and then remove) additional interface parameters to the module beyond those named in the strategy type.

Figure 4B:
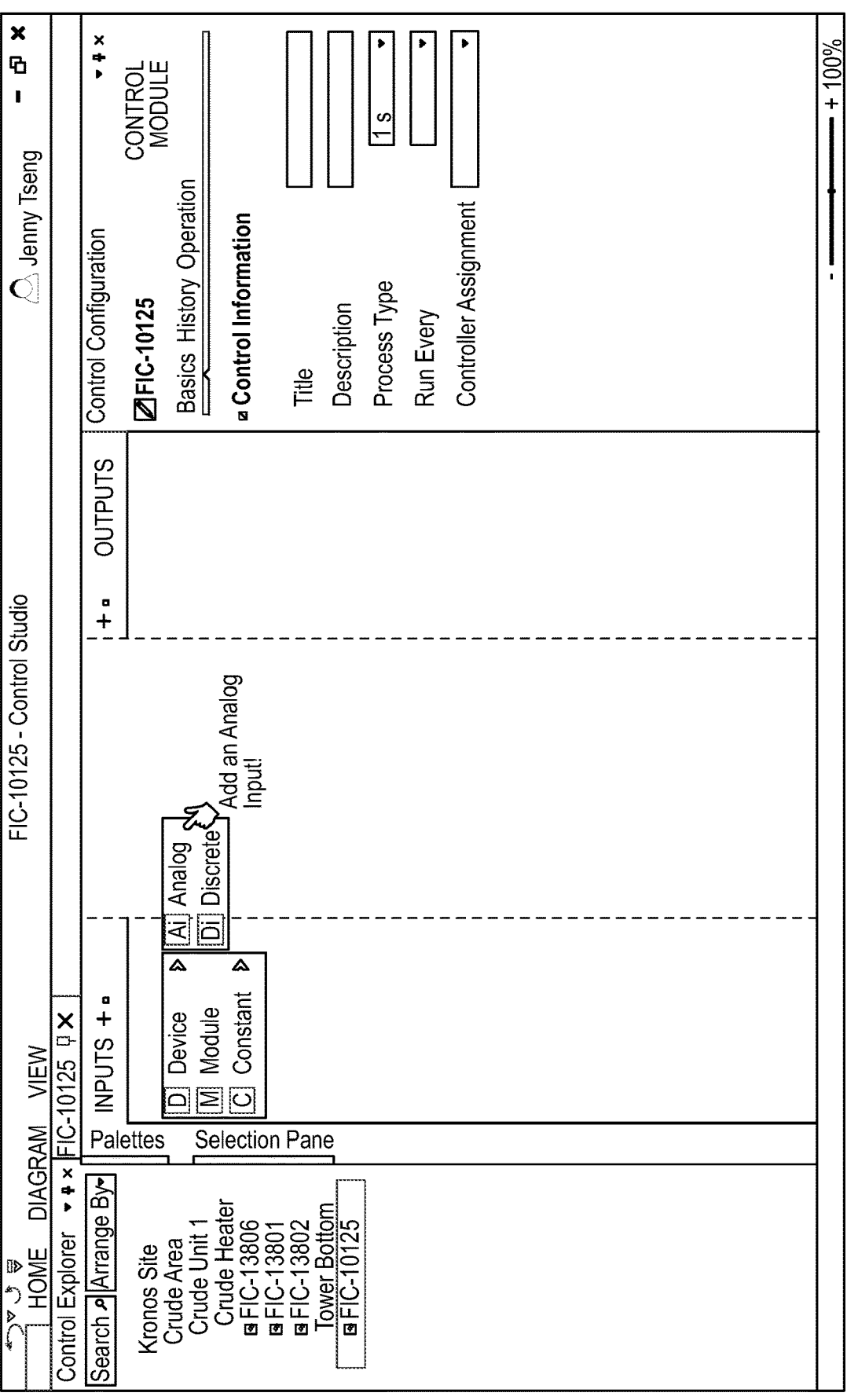
Figure 4C:
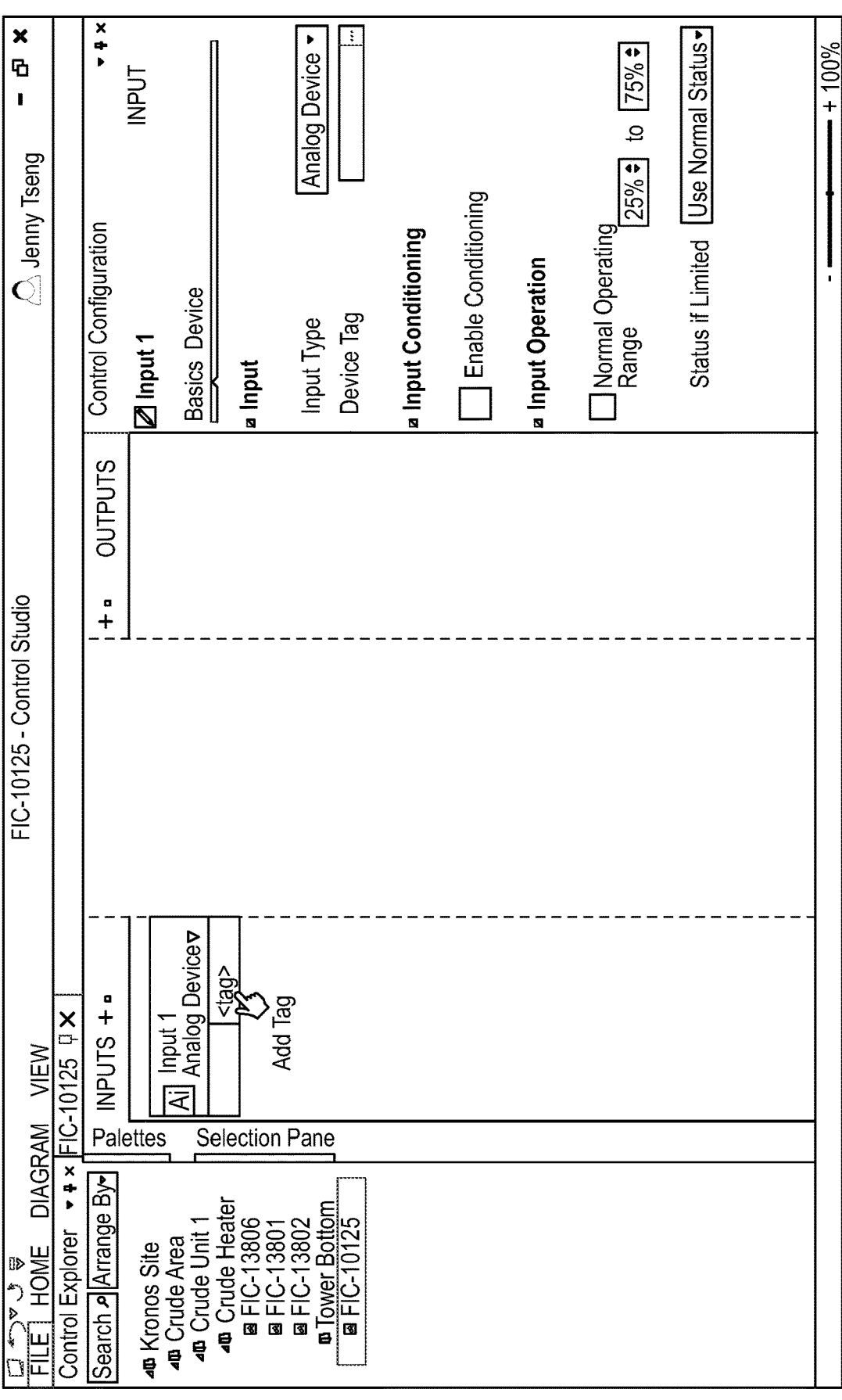
Figure 4D:
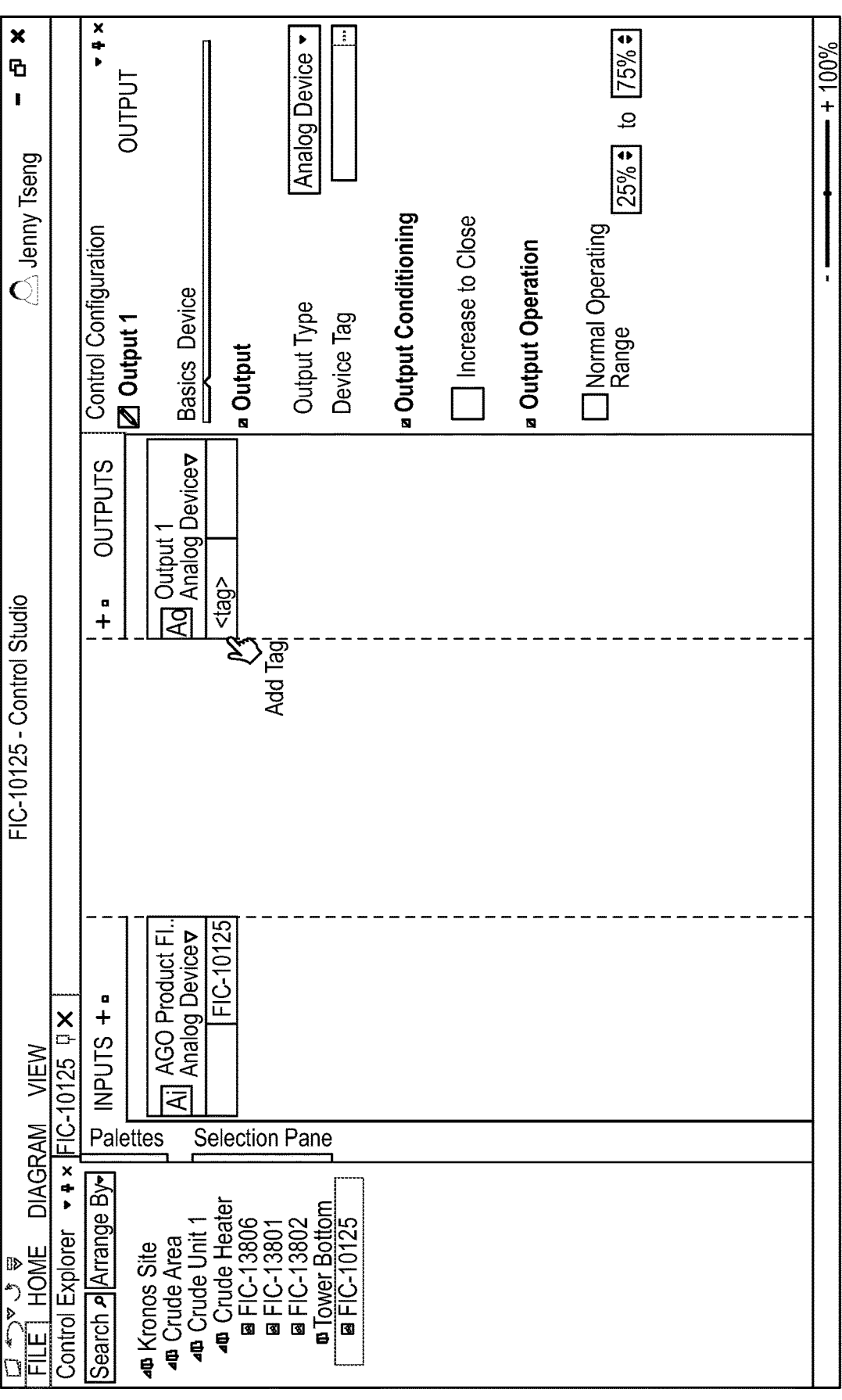

For instance, after the user specifies a control strategy, FIG. 4B illustrates that various types of input interface parameters are available for a user to select to populate the control module. Generally speaking, configuring an interface parameter for a control module involves choosing a "public" (i.e., user-friendly) name for the interface parameter, and optionally a title (per language), and description (per language). For instance, as shown at FIG. 4C, after selecting, e.g., an analog device input interface parameter, a user may specify a tag and/or a name for the interface parameter. As shown at FIG. 4D, the user may further select an output interface parameter (e.g., an analog device output parameter) and may specify a tag and/or a name for the output interface parameter.

Figure 4E:
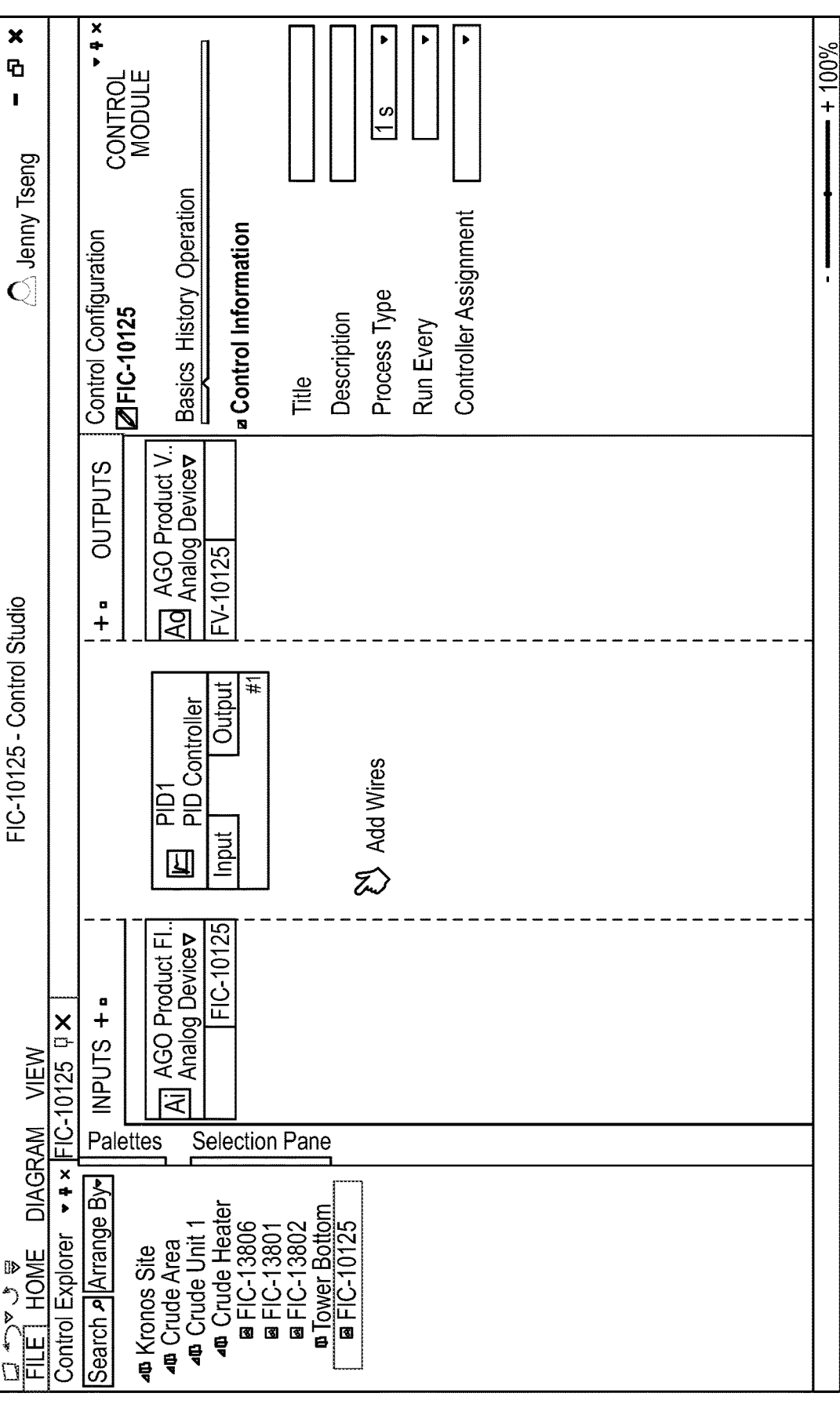
Figure 4F:
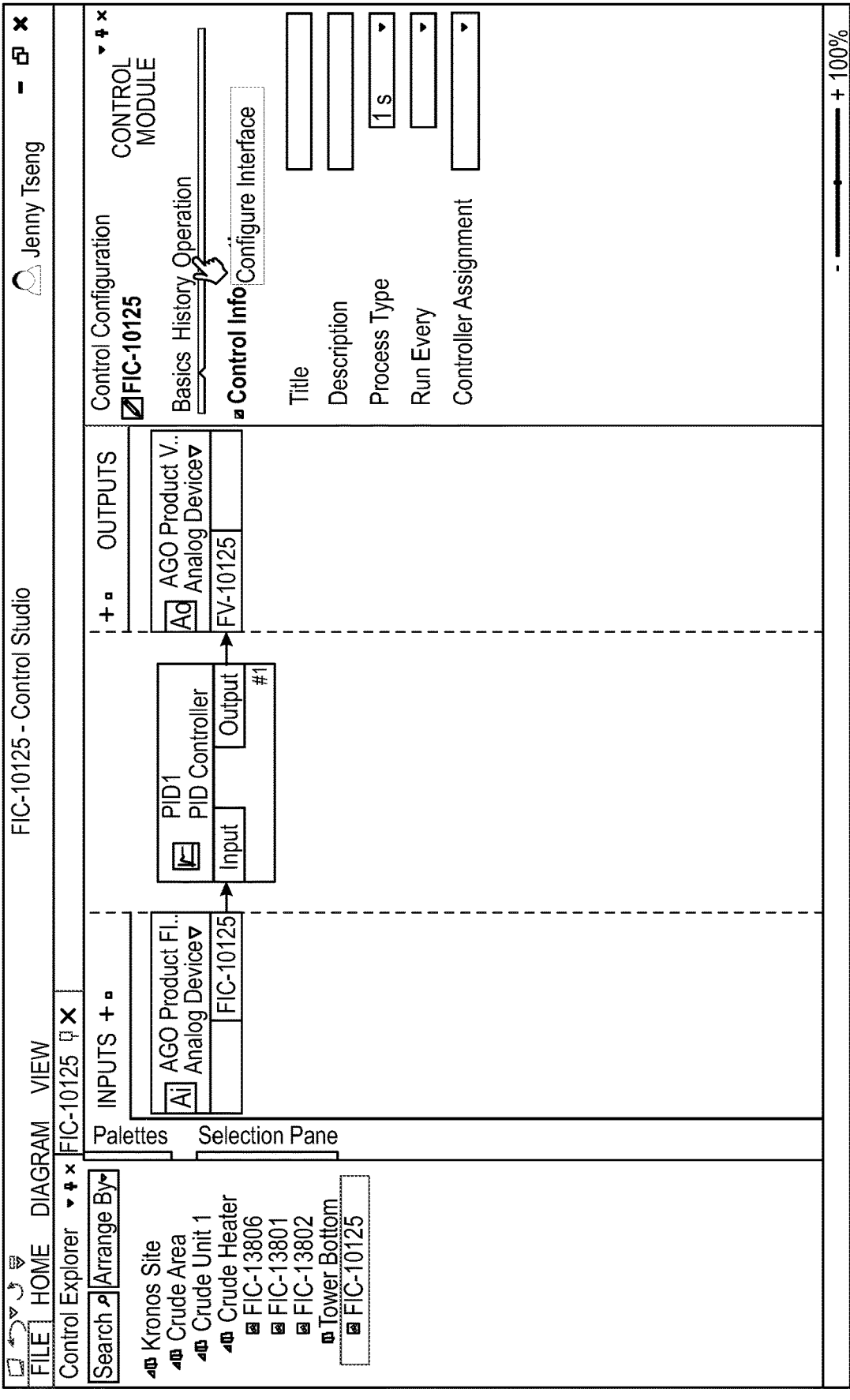
Figure 4G:
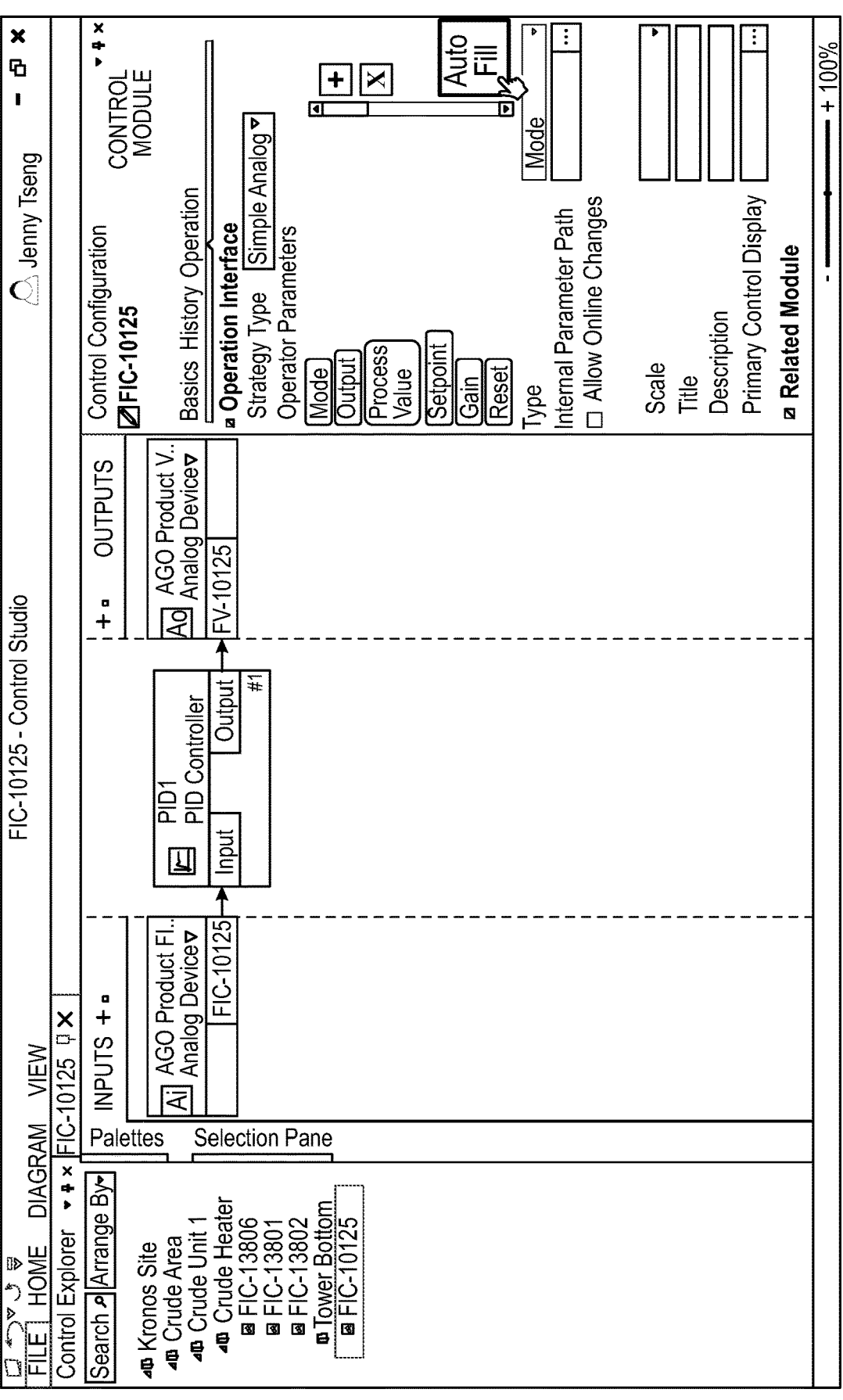

Configuring the interface parameters further includes choosing the intended access, e.g., read or read/write. For read/write interface parameters, this may further include choosing synchronization preferences (e.g., never, always, or requires user intervention); valid values and ranges; and/or security rules. Additionally, configuring the interface parameter includes choosing a corresponding internal parameter path within the module (e.g., a parameter in a primitive function block (usage) or a parameter in a module input or a module output). For instance, as shown at FIG. 4E, the user may further select a function block to add to the control module, e.g., a PID block. The function block may include its own internal parameters, e.g., the "input" and "output" parameters shown at FIG. 4E. As shown at FIG. 4F, a user may further add "wires" or links connecting the internal parameters of the function block to the interface parameters. For instance, a user may specify that the analog device input interface parameter is to be linked to an "input" internal parameter of the PID function block, and that the analog device output interface parameter is to be linked to an "output" internal parameter of the PID function block. Furthermore, configuring the interface parameter may include selecting an interface parameter type (e.g., one of any of the parameter types supported in primitive function blocks, module inputs/outputs or module parameters.) As shown at FIG. 4G, a user may configure the interface by selecting a strategy type (e.g., "simple analog") and specifying the relationships between the interface parameters and the internal parameters of the function block (e.g., "mode", "output", "process value," "setpoint," "gain", "reset," etc.)

Figure 4H:
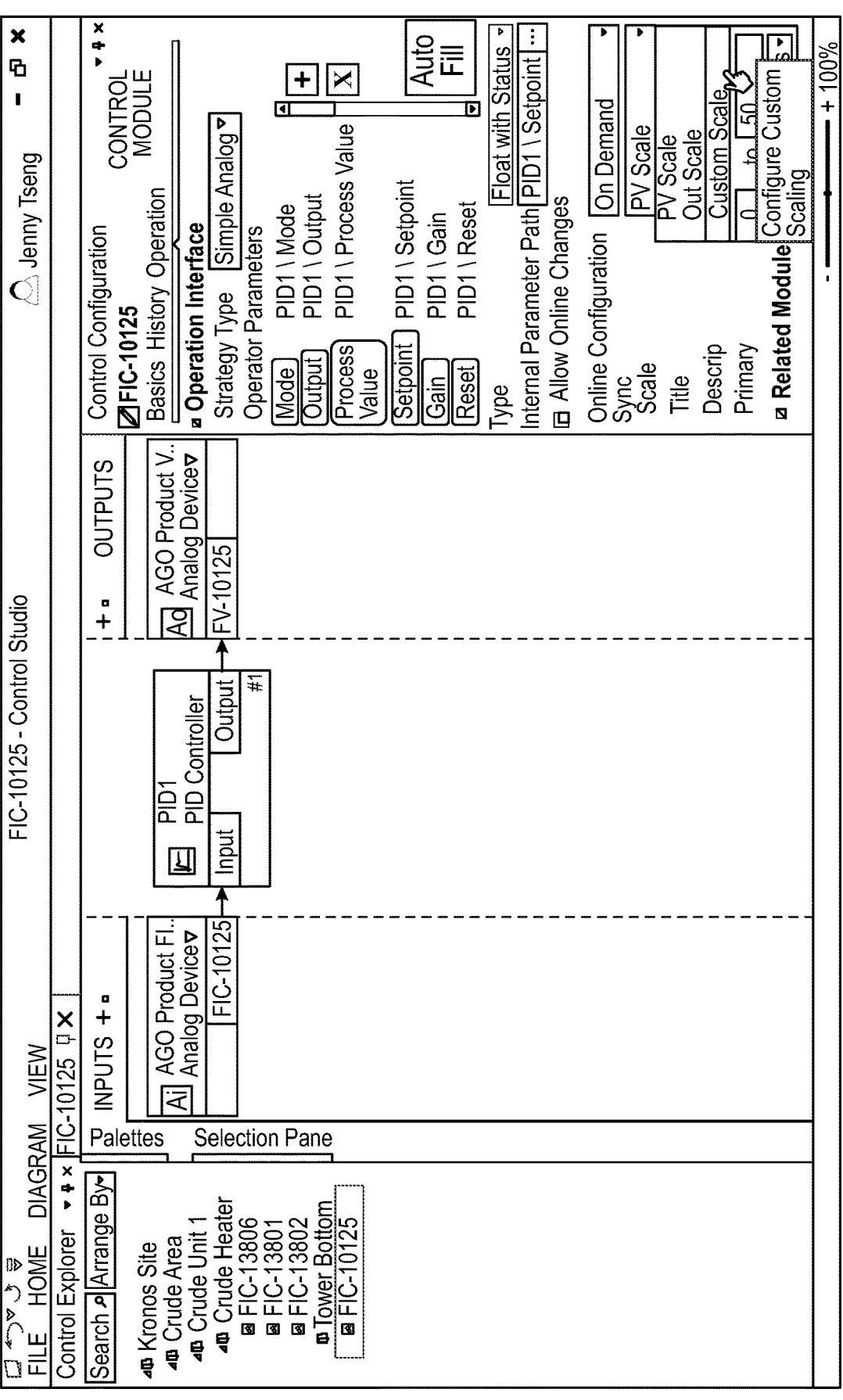

Additionally, configuring the interface parameter may include selecting history collection properties. Furthermore, e.g., as shown at FIG. 4H, configuring the interface parameter may include selecting scale and engineering units properties (e.g., an interface parameter can have a reference to another 'scaling interface parameter' in the same module that holds (potentially dynamic) information about its engineering unit range, engineering unit descriptor, and decimal place precision). Providing this level of information about an interface parameter removes ambiguity in the 'public interface' for the module (e.g. allowing parameter/field path building browsers to offer the fields expected to be present on an interface parameter; supporting better configuration (type checking) validation rules, etc.).

Figure 5:
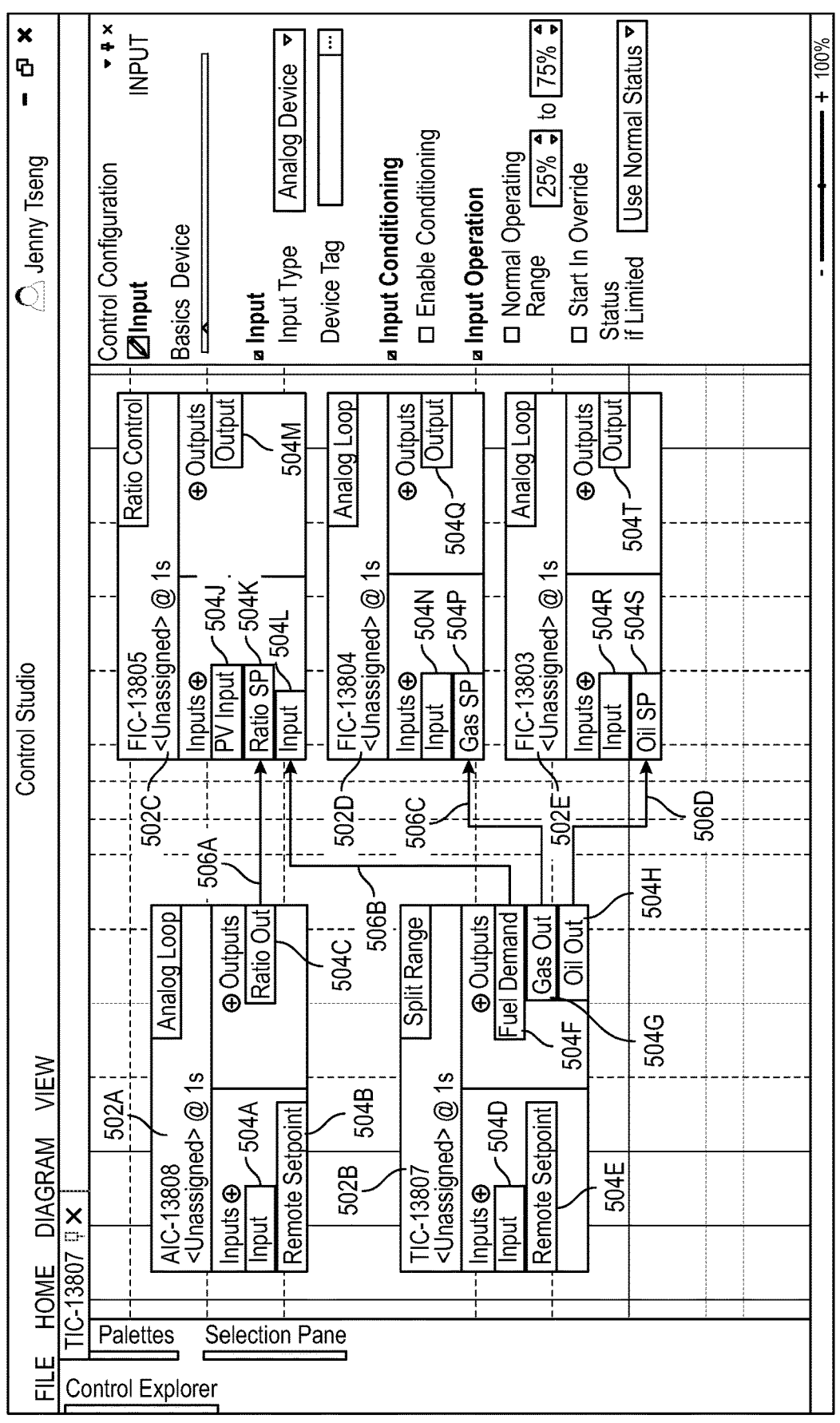
FIG. 5 illustrates an example screen depicting a user interface of a control module software interface that enables a user to configure control modules in a process control system by linking interface parameters various control modules to one another.

FIG. 5 illustrates an example screen depicting a user interface of a control module software interface that enables a user to configure control modules in a process control system by linking interface parameters of various control modules to one another. Control modules 502A, 502B, 502C, 502D, and 502E are shown in the screen of FIG. 5. Each control module may include various function blocks and internal parameters upon which the function blocks operate, but these function blocks and internal parameters are hidden from view. Instead, the screen shown at FIG. 5 displays interface parameters for each control module, without showing the internal parameters to which each of the interface parameters are linked. For instance, the control module 502A includes two input interface parameters 504A and 504B, and one output interface parameter 504C, and the control module 504B includes input interface parameters 504D and 504E, and output interface parameters 504F, 504G, and 504H. Additionally, the control module 502C includes three input parameters 504J, 504K, and 504L, and one output parameter 504M. Furthermore, the control module 502D includes two input interface parameters 504N and 504P, and one output interface parameter 504Q. Finally, the control module 502E includes two input parameters 504R and 504S, and one output parameter 504T.

A user, such as a configuration engineer of the control module software interface may specify which interface parameters of various control modules are linked to interface parameters of other control modules using "wires" or links 506A, 506B, 506C, and 506D shown at FIG. 5. For instance, the user may specify that the output interface parameter 504C of control module 502A is to be linked to the input interface parameter of control module 502C using the link 506A. Similarly, the user may specify that the output interface parameter 504F of control module 502B is to be linked to the input interface parameter 504L of control module 502C using the link 506B. Additionally, the user may specify that the output interface parameter 504G of control module 502B is to be linked to the input interface parameter 504P of control module 502D using the link 506C. Finally, the user may specify that the output interface parameter 504H of control module 502B is to be linked to the input interface parameter 504S of control module 502E using the link 506D. Linking interface parameters to one another can allow parameter values from one interface parameter to be sent to a linked parameter, e.g., so that the output of a function block of one control module may be used as an input in another control module.

Of course, these links are simply examples, and a user may specify various different links between interface parameters of various control modules as needed. Additionally, in some examples, a given output interface parameter from one control module may be linked to multiple input interface parameters of various other control modules, and vice versa. Moreover, in some examples, an output interface parameter from a control module may be linked to other external applications (e.g., in addition to other control modules). For instance, an output interface parameter may be linked to a display application so that the display application has access to a parameter value in order to display the parameter value to a user (e.g., an operator). Additionally, in some examples, an input interface parameter from a control module may be linked to other external sources, such as measurements made by field devices, or indications of states of field devices within the process control plant.

It will be understood that the systems and methods for configuring control modules in process control systems described herein can be implemented as one or more computer applications, modules or programs, and can be executed in one or more computer processor devices within any desired process plant environment. While the applications, routines and modules described herein are preferably implemented in software stored in, for example, a server, a workstation, a handheld device or other computer, these routines may alternatively or additionally be implemented in hardware, firmware, application specific integrated circuits, programmable logic circuits, etc., as desired. If implemented in software, the routines or applications may be stored in any computer readable memory such as on a magnetic disk, a laser disk, an EPROM or EEPROM, solid state or other storage medium, in a RAM or ROM of a computer, handheld device, controller, field device, etc. Likewise, this software may be delivered to a user or a device via any known or desired delivery method including, for example, over a communication channel such as a telephone line, the Internet, on a transportable medium, such as a computer readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system, comprising:
one or more field devices positioned in a process control plant;
a control module configured to generate control signals for controlling the one or more field devices, the control module configured to operate on one or more internal parameters to execute a control strategy; and
a control module software interface configured to define a set of interface parameters based on a strategy type associated with the control strategy of the control module,
wherein each interface parameter of the set of interface parameters is linked to one of the one or more internal parameters of the control module, wherein the one or more internal parameters of the control module are not accessible by any of:
one or more other control modules, wherein the one or more other control modules are configured to generate control signals for controlling the one or more field devices, and
one or more external applications that are external to the control module, wherein the one or more external applications include one or more of a configuration application or a display application, and
wherein each interface parameter is accessible to be one or more of: (i) written to or (ii) read by at least one of:
the one or more other control modules, and
the one or more external applications that are external to the control module.

2. The process control system of claim 1, wherein each interface parameter of the set of interface parameters is linked to one of the one or more internal parameters of the control module based on input from a user.

3. The process control system of claim 1, wherein each interface parameter of the set of interface parameters is automatically linked to one of the one or more internal parameters of the control module by the control module software interface.

4. The process control system of claim 1, wherein each interface parameter is associated with a name, and wherein the name is accessible by one or more of another control module or by one or more external applications.

5. The process control system of claim 4, wherein the name with which each interface parameter is associated is specified based on input from a user.

6. The process control system of claim 1, wherein whether each interface parameter is accessible to be (i) written to or (ii) read by at least one of: the one or more other control modules, and the one or more external applications that are external to the control module is specified based on input from a user.

7. The process control system of claim 1, wherein scaling units for each interface parameter are specified based on input from a user.

8. The process control system of claim 1, wherein interface parameter types for reach respective interface parameter are specified based on input from a user.

9. The process control system of claim 1, wherein one or more interface parameters of the set of interface parameters are associated with security permissions restricting changes that can be made to the one or more interface parameters during runtime of the process control plant.

10. A method in a process control system, comprising:
defining, by a control module software interface, a set of interface parameters for a control module based on a strategy type associated with a control strategy of the control module;
linking, by the control module software interface, each interface parameter of the set of interface parameters to a respective internal parameter of one or more internal parameters of the control module, wherein the control module is configured to operate on the one or more internal parameters to execute the control strategy in order to generate control signals for controlling one or more field devices positioned in a process control plant;
allowing, by the control module software interface, at least one of: one or more other control modules, and one or more external applications that are external to the control module, to access the set of interface parameters for the control module to one or more of: (i)

write to or (ii) read to the set of interface parameters for the control module, wherein the one or more other control modules are configured to generate control signals for controlling the one or more field devices, and wherein the one or more external applications include one or more of a configuration application or a display application; and denying, by the control module software interface, the one or more other control modules, and the one or more external applications that are external to the control module, access to the one or more internal parameters of the control module.

11. The method of claim 10, further comprising:

specifying, by the control module software interface, which interface parameter is to be linked to which respective internal parameter of the control module based on input from a user.

12. The method of claim 10, wherein one or more interface parameters of the set of interface parameters are automatically linked to respective internal parameters of the control module.

13. The method of claim 10, further comprising:

specifying, by the control module software interface, a name for each interface parameter based on input from a user.

14. The method of claim 13, wherein allowing one or more of another control module or one or more external applications to access the set of interface parameters for the control module includes allowing one or more of another control module or one or more external applications to access names associated with each of the set of interface parameters for the control module.

15. The method of claim 10, further comprising:

specifying, by the control module software interface, which interface parameters of the set of interface parameters are to be accessible to be (i) written to or (ii) read by one or more of another control module or by one or more external applications based on input from a user.

16. The method of claim 10, further comprising:

specifying, by the control module software interface, scaling units for each interface parameter based on input from a user.

17. The method of claim 10, further comprising:

specifying, by the control module software interface, interface parameter types for each interface parameter based on input from a user.

18. The method of claim 10, further comprising:

specifying, by the control module software interface, security permissions for each interface parameter based on input from a user, wherein the security permissions for a respective interface parameter restrict changes that can be made to the respective interface parameter during runtime of the process control plant.

* * * * *